United States Patent
Browning

(10) Patent No.: US 11,740,662 B2
(45) Date of Patent: *Aug. 29, 2023

(54) METHODS, SYSTEMS AND APPARATUS TO MANAGE A SPATIALLY DYNAMIC DISPLAY

(71) Applicant: Intel Corporation, Santa Clara, CA (US)

(72) Inventor: David W. Browning, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/674,556

(22) Filed: Feb. 17, 2022

(65) Prior Publication Data

US 2022/0236768 A1    Jul. 28, 2022

Related U.S. Application Data

(63) Continuation of application No. 16/658,848, filed on Oct. 21, 2019, now Pat. No. 11,262,802, which is a continuation of application No. 16/201,160, filed on Nov. 27, 2018, now Pat. No. 10,474,197, which is a continuation of application No. 15/596,323, filed on
(Continued)

(51) Int. Cl.
*G06F 1/16* (2006.01)
*G09G 5/373* (2006.01)
*G09G 3/00* (2006.01)
*G09G 5/00* (2006.01)
*G09G 3/20* (2006.01)

(52) U.S. Cl.
CPC .......... *G06F 1/1652* (2013.01); *G06F 1/1622* (2013.01); *G09G 3/035* (2020.08); *G09G 3/20* (2013.01); *G09G 5/005* (2013.01); *G09G 5/373* (2013.01); *G09G 2320/08* (2013.01); *G09G 2340/04* (2013.01); *G09G 2340/14* (2013.01)

(58) Field of Classification Search
None
See application file for complete search history.

(56) References Cited

U.S. PATENT DOCUMENTS 5,870,090 A    2/1999   Takai et al.
9,651,997 B2   5/2017   Browning
(Continued)

OTHER PUBLICATIONS

Avi, "Designing for Device Orientation: From Portrait to Landscape," Aug. 10, 2012, retrieved from https://www.smashingmagazine.com/2012/08/designing-device-oriented-portrait-landscape on Jan. 4, 2018, 17 pages.
(Continued)

*Primary Examiner* — David H Chu
(74) *Attorney, Agent, or Firm* — Hanley, Flight & Zimmerman, LLC

(57) ABSTRACT

Methods, apparatus, systems and articles of manufacture are disclosed An example apparatus to update a spatially adjustable display disclosed herein includes a display size monitor to acquire an indication of a size of the spatially adjustable display, a service image comparator to compare the indication of the size to a size model, and a source image adjuster to invoke visual configuration adjustments to an output image of the spatially adjustable display based on parameters identified in the size model.

19 Claims, 8 Drawing Sheets

Related U.S. Application Data

May 16, 2017, now Pat. No. 10,168,742, which is a continuation of application No. 14/447,232, filed on Jul. 30, 2014, now Pat. No. 9,651,997.

(56) References Cited

U.S. PATENT DOCUMENTS

| | | |
|---|---|---|
| 10,168,742 B2 | 1/2019 | Browning |
| 10,474,197 B2 | 11/2019 | Browning |
| 11,262,802 B2 | 3/2022 | Browning |
| 2004/0176906 A1 | 9/2004 | Matsubara et al. |
| 2007/0168859 A1 | 7/2007 | Fortes |
| 2007/0180401 A1 | 8/2007 | Singh et al. |
| 2008/0084389 A1* | 4/2008 | Mac ............... H04N 21/42208 345/158 |
| 2008/0086685 A1 | 4/2008 | Janky et al. |
| 2008/0144265 A1 | 6/2008 | Aoki |
| 2008/0263174 A1 | 10/2008 | Manson et al. |
| 2008/0313567 A1* | 12/2008 | Sabin ............... G06F 3/0481 715/835 |
| 2009/0327871 A1 | 12/2009 | Wolf et al. |
| 2010/0123724 A1* | 5/2010 | Moore ............... H04M 1/7243 345/173 |
| 2011/0035691 A1* | 2/2011 | Kim ............... G06F 3/0486 715/765 |
| 2011/0084986 A1* | 4/2011 | Kim ............... G06F 3/0488 345/660 |
| 2011/0161869 A1 | 6/2011 | Yoo et al. |
| 2011/0228331 A1 | 9/2011 | Yamada |
| 2012/0197982 A1 | 8/2012 | Waher |
| 2013/0134929 A1 | 5/2013 | Alberth |
| 2013/0234951 A1 | 9/2013 | Kim et al. |
| 2013/0275910 A1 | 10/2013 | Kim et al. |
| 2013/0285922 A1 | 10/2013 | Alberth, Jr. et al. |
| 2013/0314762 A1* | 11/2013 | Kwack ............... G02F 1/09 359/280 |
| 2013/0328912 A1 | 12/2013 | Najarian et al. |
| 2013/0332869 A1 | 12/2013 | Ferry et al. |
| 2013/0342439 A1 | 12/2013 | Kwack et al. |
| 2014/0009419 A1 | 1/2014 | Kim et al. |
| 2014/0137041 A1 | 5/2014 | Jeon et al. |
| 2014/0359496 A1 | 12/2014 | Cammarata |
| 2014/0375702 A1 | 12/2014 | Cho et al. |
| 2015/0022436 A1 | 1/2015 | Cho et al. |
| 2015/0199110 A1 | 7/2015 | Nakazato |
| 2015/0338888 A1* | 11/2015 | Kim ............... G06F 1/1643 345/156 |
| 2016/0033999 A1 | 2/2016 | Browning |
| 2017/0011714 A1 | 1/2017 | Eim et al. |
| 2018/0067521 A1 | 3/2018 | Browning |

OTHER PUBLICATIONS

United States Patent and Trademark Office, "Final Rejection," mailed in connection with U.S. Appl. No. 16/658,848, dated Jun. 24, 2021, 19 pages.

United States Patent and Trademark Office, "Final Rejection," mailed in connection with U.S. Appl. No. 16/658,848, dated Sep. 1, 2020, 16 pages.

United States Patent and Trademark Office, "Non-final Office Action," mailed in connection with U.S. Appl. No. 14/447,232, dated Jul. 15, 2016, 8 pages.

United States Patent and Trademark Office, "Non-final Office Action," mailed in connection with U.S. Appl. No. 15/596,323, dated Jan. 4, 2018, 5 pages.

United States Patent and Trademark Office, "Non-final Office Action," mailed in connection with U.S. Appl. No. 16/201,160, dated Apr. 4, 2019, 8 pages.

United States Patent and Trademark Office, "Non-final Office Action," mailed in connection with U.S. Appl. No. 16/658,848, dated Jan. 22, 2021, 17 pages.

United States Patent and Trademark Office, "Non-final Office Action," mailed in connection with U.S. Appl. No. 16/658,848, dated Jan. 24, 2020, 13 pages.

United States Patent and Trademark Office, "Notice of Allowance," mailed in connection with U.S. Appl. No. 14/447,232, dated Jan. 6, 2017, 7 pages.

United States Patent and Trademark Office, "Notice of Allowance," mailed in connection with U.S. Appl. No. 15/596,323, dated Aug. 29, 2018, 14 pages.

United States Patent and Trademark Office, "Notice of Allowance," mailed in connection with U.S. Appl. No. 16/201,160, dated Jul. 11, 2019, 7 pages.

United States Patent and Trademark Office, "Notice of Allowance," mailed in connection with U.S. Appl. No. 16/658,848, dated Oct. 22, 2021, 8 pages.

Whitworth, "Evolution of Monitors-Teletype to LED," Direct2Dell the Official Dell Corporate Blog, Aug. 29, 2012, retrieved from http://en.community.dell.com/dell-blogs/direct2dell/b/direct2dell/archive on Apr. 17, 2014, 1 page.

\* cited by examiner

METHODS, SYSTEMS AND APPARATUS TO MANAGE A SPATIALLY DYNAMIC DISPLAY

CROSS-REFERENCE TO RELATED APPLICATIONS

This patent arises from a continuation of U.S. patent application Ser. No. 16/658,848, filed Oct. 21, 2019, entitled, "METHODS, SYSTEMS AND APPARATUS TO MANAGE A SPATIALLY DYNAMIC DISPLAY," which is a continuation of U.S. patent application Ser. No. 16/201,160 (now U.S. Pat. No. 10,474,197), filed Nov. 27, 2018, entitled "METHODS, SYSTEMS AND APPARATUS TO MANAGE A SPATIALLY DYNAMIC DISPLAY," which is a continuation of U.S. patent application Ser. No. 15/596,323 (now U.S. Pat. No. 10,168,742), filed May 16, 2017, titled "METHODS, SYSTEMS AND APPARATUS TO MANAGE A SPATIALLY DYNAMIC DISPLAY," which is a continuation of U.S. patent application Ser. No. 14/447,232 (now U.S. Pat. No. 9,651,997), filed Jul. 30, 2014, entitled "METHODS, SYSTEMS AND APPARATUS TO MANAGE A SPATIALLY DYNAMIC DISPLAY." This patent claims priority to those filing dates for all applicable subject matter and all aforementioned applications are hereby incorporated herein in their entireties.

FIELD OF THE DISCLOSURE

This disclosure relates generally to physically alterable displays, and, more particularly, to methods, systems and apparatus to manage a spatially dynamic display.

BACKGROUND

In recent years, computing devices have become ubiquitous in households, workplaces, commerce, and entertainment venues. Relatively early computing device display technology included teletype machines, and cathode ray tubes. Subsequent advancements in display technologies included liquid crystal displays, light emitting diode displays, and plasma screens.

DETAILED DESCRIPTION

Figure 1A:
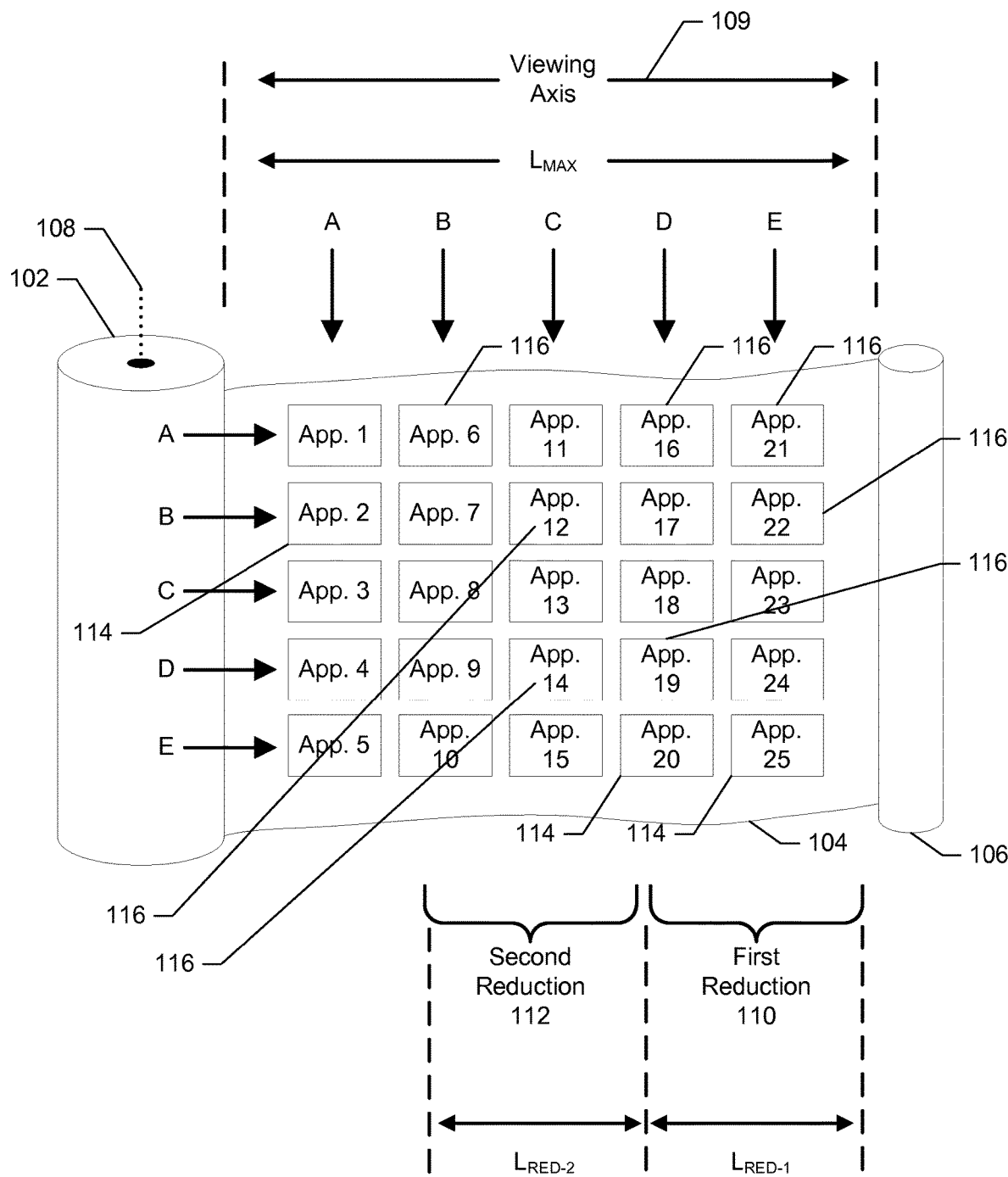
FIG. 1A is a schematic illustration of a system to manage a spatially dynamic display when the display has a maximum viewing area.

Computing devices typically include one or more interface devices to accommodate input and/or output. In some examples, the computing devices are designed and/or otherwise provisioned to interact with one or more users, in which a visual and/or audio interface device facilitates one or more functions of a user interface (UI). Example UIs include, but are not limited to, touchscreen input devices, mouse pointer devices, and visual display devices to render video information to the user. Example visual display devices include, but are not limited to, a cathode ray tube (CRT) display, a light emitting diode (LED) display, a liquid crystal display (LCD), in which one or more of the aforementioned display devices may include touch control (e.g., an ability to control a mouse cursor of an operating system without a mouse device).

Traditional display devices, including examples disclosed above, include a physically rigid viewing area having a particular screen size (e.g., a set spatial dimension) that is established at the time the display device is manufactured. For example, traditional display devices have a display size having a width value, a height value, a total viewable area value and/or a diagonal length value. In some examples, the diagonal length value is provided by a manufacturer that indicates a length between two opposite screen corners, and an aspect ratio indicating a ratio of the horizontal length to a vertical length is provided. At the time of this writing, display devices typically have aspect ratios of 4:3, 5:4, 16:10 and 16:9, but example methods, systems and apparatus to manage a spatially dynamic display are not limited thereto. While traditional display devices, such as those described above, include a spatial dimension with a rigid viewing surface that is established at the time of manufacture, example methods, systems and apparatus disclosed herein manage display behavior for physically alterable displays that exhibit spatially dynamic properties.

Physically alterable displays that have spatially dynamic properties (sometimes referred to herein as a "dynamic display," or a "spatially adjustable display") include display devices that have two or more viewing areas for rendering visual information. In some examples, a dynamic display has a first length dimension and a first width dimension that results in a first viewable area for a user. However, the dynamic display may be manipulated to change the first length dimension to a second length dimension, and/or change the first width dimension to a second width dimension, thereby resulting in a second viewable area for a user. In some examples, the dynamic display is flexible such that the flexible display may wrap around itself in a generally cylindrical shape. In other examples, a portion of the dynamic display that is not viewable (e.g., a portion that is wrapped around itself) may be turned off to reduce energy that would otherwise be wasted on that non-viewable portion. In still other examples, the dynamic display is spatially modified by one or more folding operations to either increase or decrease a viewable area for the user.

Example spatially dynamic displays, such as flexible displays and/or foldable displays, may be used with any type of computing device, such as desktop computers, laptop computers, mobile telephones, e-readers and/or tablet computing devices. In some examples, the dynamic display associated with the computing device has a first viewing area at a first time, but the user manipulates (e.g., by rolling the display, by folding the display, etc.) the dynamic display at a second time to cause a second viewing area at a second time. Example methods, systems and apparatus disclosed herein detect such contextual changes to the dynamic display viewing area to manage one or more alternate image output signals of the dynamic display device. For example, if the first viewing area at the first time is larger than the second viewing area at the second time (e.g., the user caused a reduction in the viewable area by rolling a portion of the dynamic display device around itself, or by folding a portion of the dynamic display under itself), then example methods, systems and apparatus disclosed herein manage the image output signals to the dynamic display device to conform to a display configuration better adapted to the second viewing area.

In some examples, managing the image output signals are dynamically adjusted to fit within an available screen area of the dynamic display device in response to physical changes of the screen area. The image output signals associated with a first available screen area may have icons and text that, in response to a change from a first available screen area to a second available screen area, are increased or decreased in size to better fit to the second available screen area. In other examples, one or more icons may be associated with a priority value to indicate a relative importance with other icons. In operation, an example icon with a relatively higher priority value will be preserved for rendering on the dynamic display device when the available screen area decreases. One or more icons with relatively lower priority values are removed to accommodate rendering of the icons having the relatively higher value, and a link icon may be rendered to allow access to the icons associated with the relatively lower priority value. In some examples, icons having a relatively highest priority value are referred to herein as primary icons, and icons having a relatively lower priority value are referred to herein as secondary icons, tertiary icons, etc.

FIG. 1A is an example system 100 to manage a spatially dynamic display. In the illustrated example of FIG. 1A, the system 100 includes a central housing 102 connected to a spatially dynamic display 104 that can be manipulated via a screen area adjustment handle 106. The example central housing 102 of FIG. 1A is illustrated with a generally cylindrical shape to allow the example spatially dynamic display 104 to wrap around a central storage axis 108 for storage. While some of the examples disclosed herein include a spatially dynamic display that is flexible, example methods, apparatus, systems and/or articles of manufacture disclosed herein are not limited thereto. For instance, some example spatially dynamic displays may be a relatively rigid material having one or more foldable portions. In some examples, each of the foldable portions are separated and/or otherwise partitioned by a bendable crease that, when folded by a number of degrees (e.g., 90 degrees, 180 degrees, etc.), causes the aggregate area of the spatially dynamic display to decrease.

Continuing with the example flexible-type spatially dynamic display 104 of FIG. 1A, in the event the example screen area adjustment handle 106 is pulled in a direction to the right of the example central housing 102 along a viewing axis 109, then the example spatially dynamic display 104 will unwind from the central storage axis 108 to increase a viewable area (lengthen). Portions of the example spatially dynamic display 104 that are wrapped around the central storage axis 108 are not viewable to a user (e.g., non-visible portions of the spatially dynamic display 104), while portions of the example spatially dynamic display 104 that have been unwound from the central storage axis 108 may be viewed by a user along the viewing axis 109. Storage of the example spatially dynamic display 104 may occur by winding a shaft (not shown) attached to the example central storage axis 108 in a clockwise or counterclockwise direction. In some examples, the central storage axis 108 may be mechanically connected to a spring (e.g., a coil spring) to forcibly bias the spatially dynamic display 104 toward and around the central storage axis 108. The example spring bias causes a force on the example spatially dynamic display 104 in a direction toward the example central housing 102 (i.e., toward the left). In other words, in some examples the viewable portion of the example spatially dynamic display 104 along the example viewing axis 109 toward the central housing 102 and wrap around the central storage axis 108 when not in use.

The example spatially dynamic display 104 has a maximum length ($L_{MAX}$) that, when reached by pulling the example screen area adjustment handle 106 in a rightward direction from the example central housing 102, results in a maximum viewable area of the spatially dynamic display 104. When the example spatially dynamic display 104 is fully extended (e.g., pulled-out) from the example central housing 102, then a computing device communicatively connected to the example spatially dynamic display 104 may render a particular screen configuration based on the available area of the dynamic display 104. In some examples, the particular screen configuration associated with the fully extended ($L_{MAX}$) spatially dynamic display 104 reveals a maximum number of icons. In the illustrated example of FIG. 1A, the spatially dynamic display 104 renders a maximum of twenty-five (25) icons in columns A through E and rows A through E. As described in further detail below, one or more display configuration models may be invoked in response to a change in the available display area of the example spatially dynamic display 104, in which one or more icons may be prioritized to remain in the remaining viewable area when the dynamic display 104 is retracted by a certain length (e.g., less than the length $L_{MAX}$).

In some examples, a relatively smaller size of the spatially dynamic display 104 is desired. In the illustrated example of FIG. 1A, the spatially dynamic display includes a first reduction zone 110 and a second reduction zone 112. If the example spatially dynamic display 104 is retracted by a length equal to the example first reduction 110 ($L_{RED-1}$), example methods, systems and/or apparatus disclosed herein dynamically adjust the visual configuration of the spatially dynamic display based on the reduced area caused by the retraction. Similarly, if the example spatially dynamic display 104 is retracted by a length equal to the example first reduction 110 and the example second reduction 112 ($L_{RED-2}$), example methods, systems and/or apparatus disclosed herein dynamically adjust the visual configuration of the spatially dynamic display based on the reduced area caused by the retraction, as described in further detail below. While the illustrated example includes two reduction zones, examples disclosed herein are not limited thereto. In some examples, the spatially dynamic display 104 may operate between any length between the maximum extension ($L_{MAX}$) and a fully closed position, in which the entire spatially dynamic display 104 is retracted within the central housing 102.

In the event the example spatially dynamic display 104 is retracted by a length associated with the example first reduction 110, then the example icons in columns D and E will not be visible. Example methods, systems, apparatus and/or articles of manufacture disclosed herein dynamically modify the visual configuration as the spatially dynamic display 104 changes in length (e.g., as the spatially dynamic display increases in length from zero to $L_{MAX}$ and/or as the spatially dynamic display decreases in length from $L_{MAX}$ (to zero). In the illustrated example of FIG. 1A, icons associated with "App 2," "App 20" and "App 25" are assigned with a primary priority 114, "App 6," "App 12," "App 14," "App 16," "App 19," "App 21" and "App 22" are assigned with a secondary priority 116, and the remaining icons are assigned with a default tertiary priority. Generally speaking, one or more icons assigned with a primary priority, as compared to a secondary and/or tertiary priority, are indicative of a relatively greater importance to a user of a computing device, such as applications and/or programs that are used with a relatively greater frequency.

Continuing with the example in which the example spatially dynamic display 104 is reduced by a length associated with the first reduction 110 ($L_{RED\_1}$), example methods, systems, apparatus and/or articles of manufacture disclosed herein adjust the visual configuration of the remaining visible portion(s) of the spatially dynamic display 104 to render icons associated with the primary priority 114. In the event the area of the spatially dynamic display 104 has remaining space after the icons associated with the primary priority 114 are rendered, icons associated with the secondary priority 116 are arranged on the dynamic display 104 for rendering, as shown in FIG. 1B.

In some examples, portions of the spatially dynamic display 104 that have been retracted to the central housing 102 are powered off. In other words, because the example portions of the spatially dynamic display 104 stored in the central housing 102 are not visible, the example source image adjustor 306 sends one or more instructions to an example video controller to disable such non-visible portions of the spatially dynamic display. In the illustrated example of FIG. 1B, the spatially dynamic display 104 has been reduced in length $L_1$ (and corresponding area) by the first reduction 110, and icons associated with the primary priority 114 and secondary priority 116 have been rendered at the expense of the relatively lower assigned icons. However, a link button 118, when selected (e.g., via a touch-screen input, mouse click, etc.), causes one or more relatively lower priority icons to be displayed.

Figure 1B:
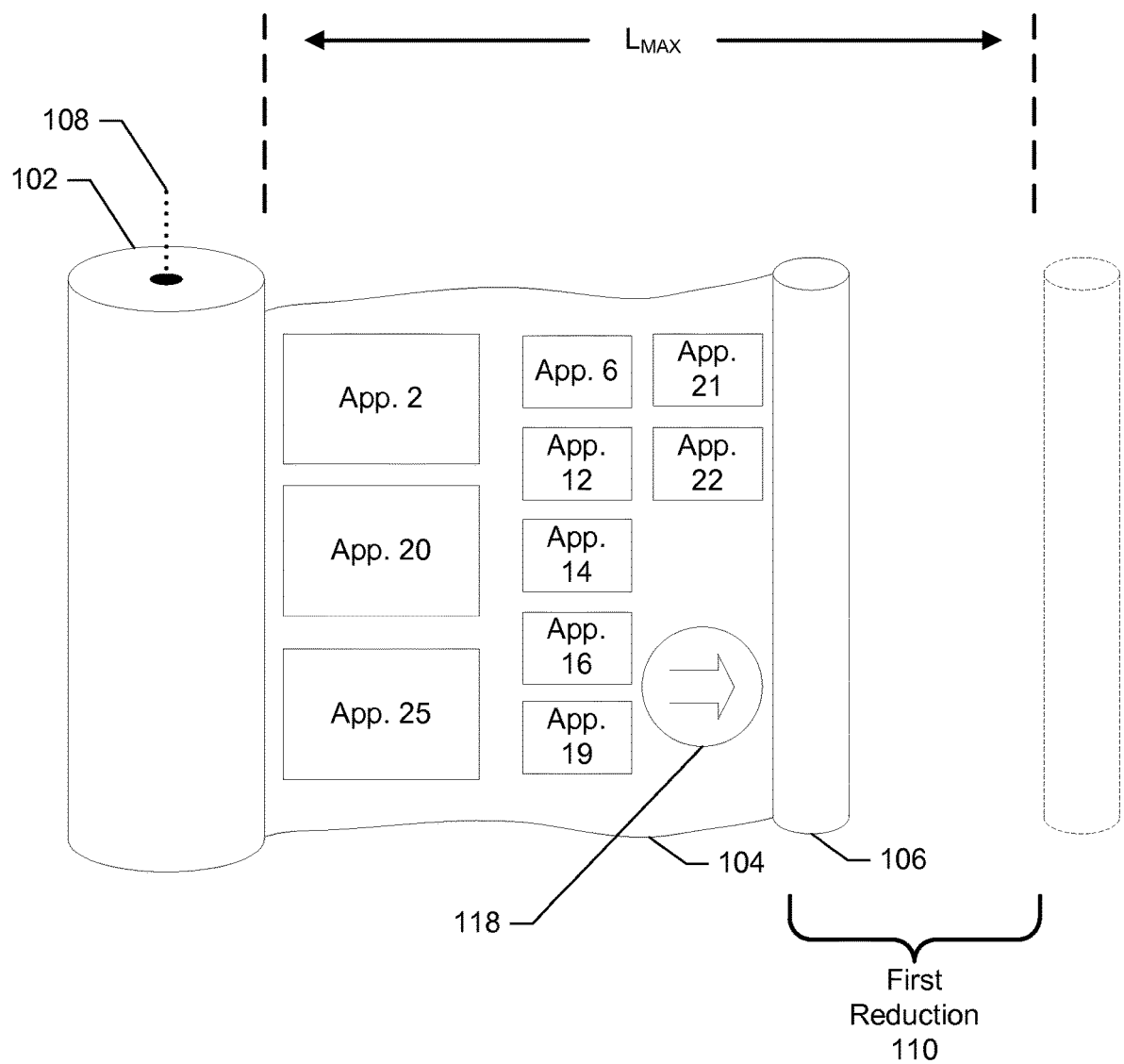
FIG. 1B is a schematic illustration of the system of FIG. 1A, in which the viewing area has been reduced by a first reduction length.
Figure 1C:
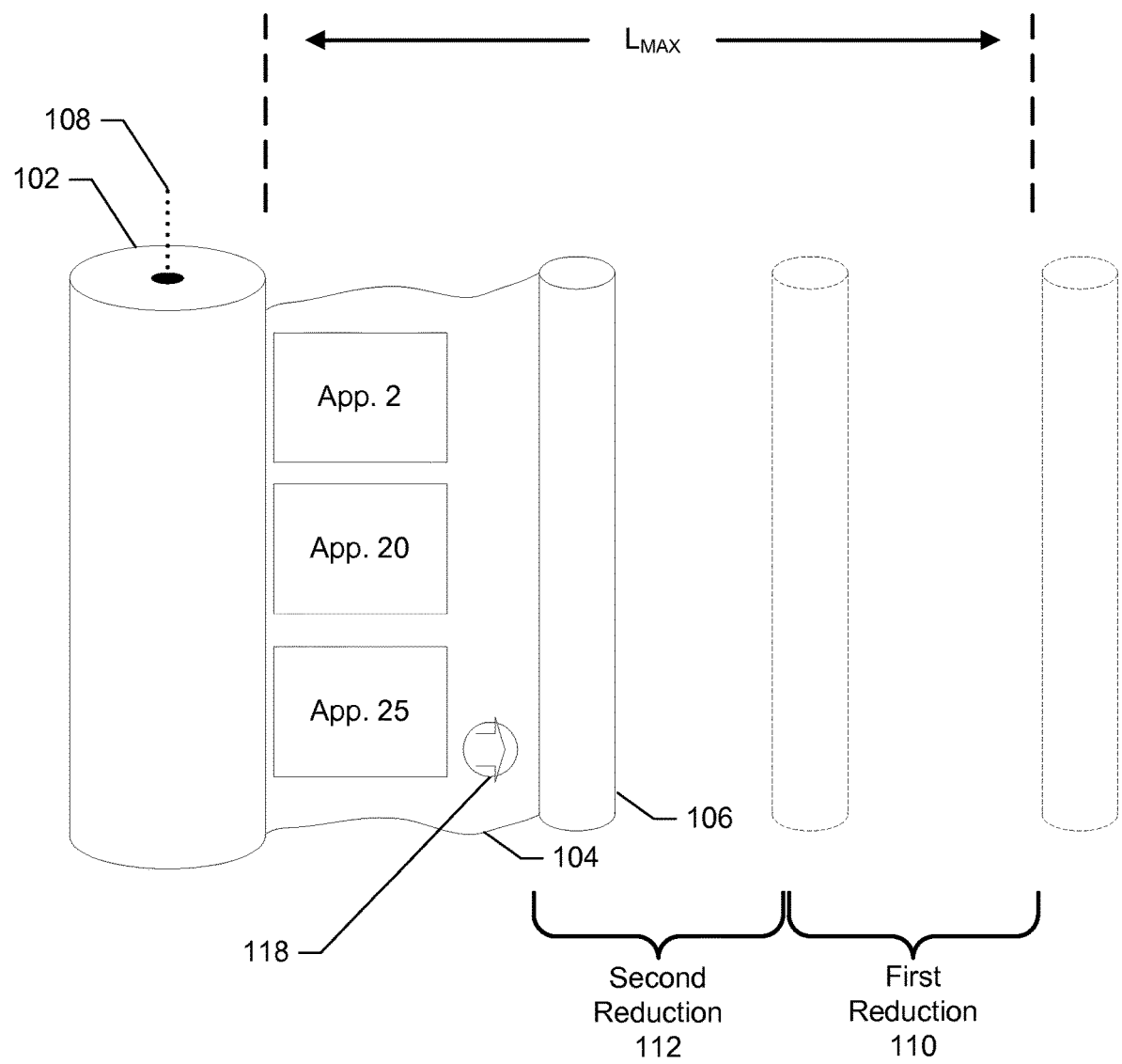
FIG. 1C is a schematic illustration of the system of FIGS. 1A and 1B, in which the viewing area has been reduced by an additional second reduction length.

FIG. 1C illustrates the example system 100 after the example spatially dynamic display 104 has been retracted by an additional length associated with the example second reduction 112. In the illustrated example of FIG. 1C, the visual configuration of the spatially dynamic display 104 is modified to render the highest priority icons 114, and the link button 118, when selected, causes one or more relatively lower priority icons to be displayed. As described above, examples disclosed above include three distinct positions of the spatially dynamic display 104, but example methods, systems, apparatus and/or articles of manufacture are not limited thereto. In some examples, dynamic modification of the visual configuration of the spatially dynamic display 104 occurs as it is retracted or extended from the central housing 102. Additionally, while the example central housing 102 is shown having a generally cylindrical shape, example methods, systems, apparatus and/or articles of manufacture disclosed herein are not limited thereto. In some examples, the central housing 102 is integrated with a computing device, such as a mobile telephone, personal computer, etc. In still other examples, the computing device may be integrated within the central housing 102. In other examples, the spatially dynamic display 104 changes a display size by one or more folds. In such examples, the spatially dynamic display 104 may be a rigid material rather than a relatively flexible material capable of rolling and/or otherwise winding around itself. The example foldable spatially dynamic display 104 may, when folded at one or more locations, cause the visual configuration of the spatially dynamic display 104 to change in the manner disclosed above in connection with FIGS. 1A-1C.

Figure 2:
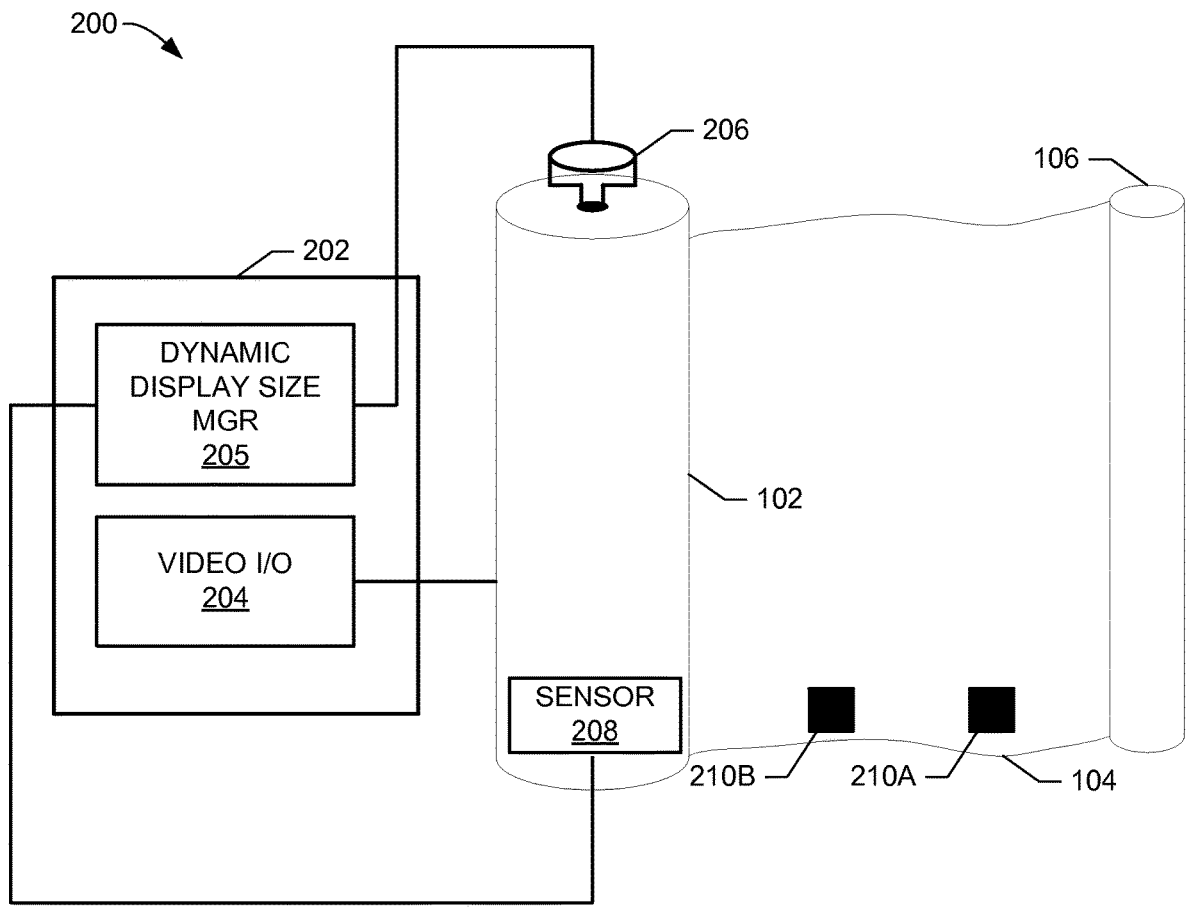
FIG. 2 is a schematic illustration of the example system shown in FIGS. 1A-1C showing example connectivity to a computing device.
Figure 2:
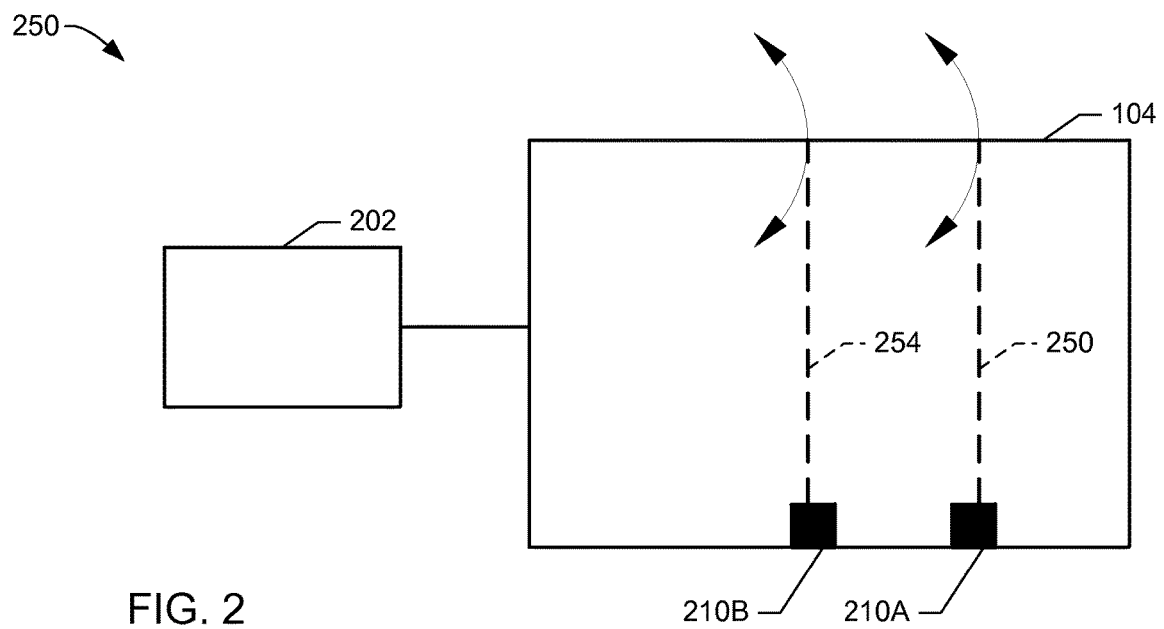

FIG. 2 illustrates additional detail of the example system 100 to manage the spatially dynamic display 104 of FIGS. 1A-1C when the spatially dynamic display 104 is constructed of a flexible material to be stored and/or used in one or more rolled/wrapped orientations 200, or when the spatially dynamic display 104 is constructed of a foldable material to be stored and/or used in one or more fully unfolded, partially folded or completely folded orientations 250. In the illustrated example of FIG. 2, the central housing 102 is communicatively connected to a computing device 202. The example computing device 202 may include, but is not limited to, a personal computer (e.g., a laptop, a desktop, etc.), a personal digital assistant, an e-reader, a mobile telephone, etc. While the computing device 202 of the illustrated example of FIG. 2 is shown as a separate entity from the central housing 102, examples disclosed herein are not limited thereto. In some examples, the computing device 202 is integrated into the central housing 102, or vice-versa. The example computing device 202 of FIG. 2 includes a video input/output (I/O) module 204 to control a visual output of the example spatially dynamic display 104 and, in some examples, respond to inputs from the spatially dynamic display 104 in the event it includes touch-screen capabilities.

The example video I/O module 204 may be an industry standard video card capable of rendering visual output based on inputs from an operating system and/or other inputs. The computing device 202 of FIG. 2 includes a dynamic display size manager 205 that is communicatively connected to the video I/O module 204 and the central housing 102. In some examples, the dynamic display size manager 205 is communicatively connected to a rotary shaft encoder 206 to determine an angular position of the central storage axis 108, which is indicative of how much of the spatially dynamic display 104 is available for viewing. In some examples, the rotary shaft encoder 206 is not used and, instead, one or more alternate techniques of determining the available viewing area are employed. For example, the central housing 102 may include a length marker sensor 208 that detects one or more delineated length markers 210, such as a first length marker 210A and a second length marker 210B attached to the example spatially dynamic display 104. Any number of length markers 210 may be attached (e.g., embedded) to the example spatially dynamic display 104 in a number of linear positions, and the example length markers 210 may be employed for use with the flexible rolled/wrapped orientation 200 and/or the foldable orientation 250. In some examples, a number of length markers 210 are embedded in the spatially dynamic display 104 in equally-spaced linear positions along the viewing axis 109. In response to the example length marker sensor 208 detecting a first length marker 210A, the example dynamic display size manager 205 may invoke one or more modifications of the visual configuration of the example spatially dynamic display 104. In particular, detecting the first length marker 210A is indicative of a portion of the example spatially dynamic display 104 that can be viewed by a user. Similarly, in response to the example length marker sensor 208 detecting a second length marker 210B, the example dynamic display size manager 205 may invoke one or more modifications of the visual configuration tailored to the alternate viewing area of the example spatially dynamic display 104.

Similarly, the example first length marker 210A and the example second length marker of the foldable orientation 250 may provide an indication of the available screen size to be used and/or otherwise energized for viewing purposes. For example, the first length marker 210A detects when a first fold portion 252 of the foldable spatially dynamic display 104 is unfolded or folded. Similarly, the example second length marker 210B detects when a second fold portion 254 of the foldable spatially dynamic display 104 is unfolded or folded.

Figure 3:
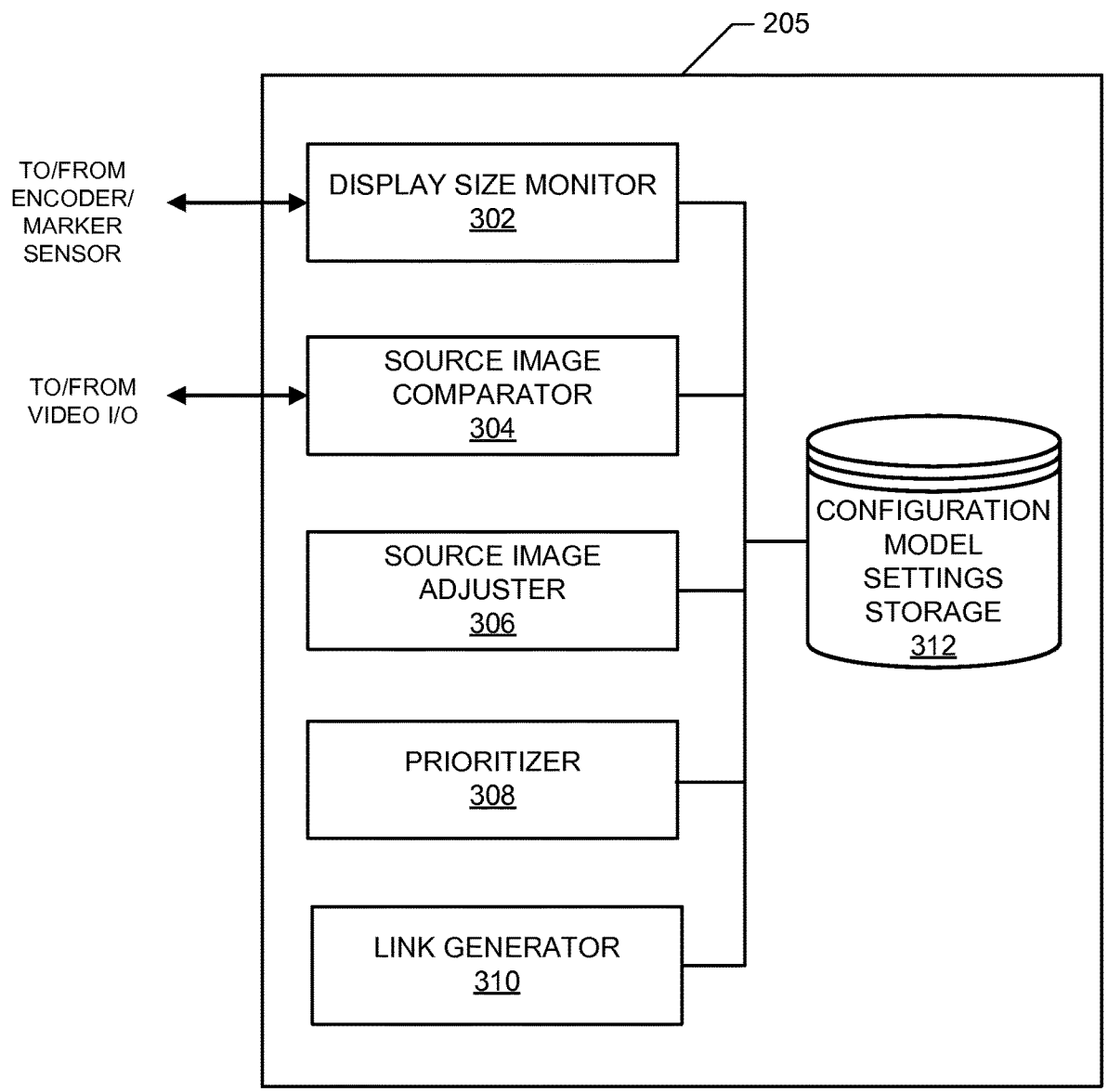
FIG. 3 is a schematic illustration of a dynamic display size manager of FIGS. 1A-1C and FIG. 2.

FIG. 3 illustrates additional detail of the example dynamic display size manager 205 of FIG. 2. In the illustrated example of FIG. 3, the dynamic display size manager 205 includes a display size monitor 302, a source image comparator 304, a source image adjuster 306, a prioritizer 308, a link generator 310 and a configuration model storage 312. In operation, the example display size monitor 302 determines an available viewable screen area of the example spatially dynamic display 104 by capturing and/or otherwise retrieving screen extraction length information or information indicative of which fold portions (e.g., the first fold portion 252, the second fold portion 254) are folded (closed) or unfolded (open). As described above, screen extraction length information may be determined by information retrieved from the example encoder 206, the example length marker sensor 208, or any other sensor indicative of how much available viewing area can be used and/or otherwise consumed by a user of the example system 100. Based on the determined available viewing area information captured by the example display size monitor 302, the example source image comparator 304 compares the available viewing area information to the example configuration model settings storage 312 to determine visual configuration instructions to be sent to the example video I/O module 204. The example configuration model settings storage 312 may store one or more configurations settings that differ based on an exposed length of the example spatially dynamic display 104.

Figure 4:
FIG. 4 is an example spatial/visual configuration table to provide rendering instructions to a spatially dynamic display.

FIG. 4 is an example spatial/visual configuration table 400 that may be stored in the example configuration model settings storage 312 and accessed by the example source image comparator 304. In the illustrated example of FIG. 4, the table 400 includes an exposed length column 402, a primary icon column 404, a primary icon size column 406, a secondary icon column 408, a secondary icon size column 410, a tertiary icon column 412, a tertiary icon size column 414 and a link button column 416. The example prioritizer 308 of FIG. 3 is employed during one or more configuration sessions (e.g., a user-initiated configuration, a factory-initiated configuration, etc.) to assign each icon with a corresponding primary, secondary, tertiary, or other priority designation. Additionally, the example prioritizer 308 identifies icon display priorities associated with a template and/or display model, such as an example table 400. The exposed length column 402 in the illustrated example of FIG. 4 includes three length values; one that reflects a full (maximum) viewing potential (e.g., 9.6 inches), one that reflects a reduction associated with the first reduction 110 (e.g., 6.4 inches), and one that reflects a reduction associated with the combined first reduction 110 and the second reduction 112 (e.g., 3.2 inches). Each of these three example display modes may be invoked by the example source image adjuster 306 based on a corresponding length marker 210 detected by the example length marker sensor 208. While the illustrated example table 400 of FIG. 4 includes three (3) delineated viewing modes, examples disclosed herein are not limited thereto. In some examples, the source image adjuster 306 may respond to different degrees of granularity in response to changing length values detected by the encoder 206, such as causing image adjustments at increments of 1 millimeter, or any other increment value of interest.

If the example display size monitor 302 retrieves an indication that the example spatially dynamic display 104 is extended 9.6 inches (e.g., a maximum extension for the example spatially dynamic display 104 of FIGS. 1A-1C and 2), which is reflected in a first row 420 of FIG. 4, then the example table 400 includes information indicative of which icons are authorized for display and corresponding sizes (e.g., size in pixels) for each authorized icon.

In the illustrated example of FIG. 4, the first row 420 indicates that all icons having a primary priority are authorized to be displayed (see column 404) with an icon dimension of 16×16 pixels (see column 406). The example first row 420 also indicates that all secondary and tertiary icons are authorized for display having corresponding dimensions of 16×16 pixels. In some examples, a link button is unnecessary because the available viewable screen area of the spatially dynamic display 104 is large enough to accommodate all desired icons. As such, the example link button column 416 indicates a "No" value to prevent a request to include a link button on the dynamic display 104 when the exposed screen length is at a value of 9.6 inches.

If the example display size monitor 302 retrieves and/or otherwise receives an indication that the example spatially dynamic display 104 changes to an alternate extension length, such as from the example fully extended 9.6 inches to 6.4 inches, then the example source image comparator 304 is invoked by the display size monitor 302 to determine corresponding display parameters. In the illustrated example of FIG. 4, the table includes a second row 422 having information indicative of which icons are authorized for display and corresponding sizes for each authorized icon. In the illustrated example of FIG. 4, the second row 422 indicates that all icons having a primary priority are authorized to be displayed (see column 404) with an icon dimension of 32×32 pixels (see column 406). The example second row 422 also indicates that all secondary icons are authorized for display (see column 408) with an icon dimension of 16×16 pixels (see column 410). However, the example second row 422 indicates that no tertiary icons are authorized for display (see column 412), but a link button 118 is authorized and/or otherwise rendered on the viewable portion of the spatially dynamic display 104 for presentation to the user (see column 416). As described above, the example link button 118 is rendered when one or more of the icons have been hidden from view due to their relatively lower priority value. The link button 118, when selected, causes the hidden icons (e.g., relatively lower priority icons) to be displayed in lieu of the icons authorized by display based on the example table 400. In other words, when the example link button 118 is selected, any secondary and/or tertiary icons may be rendered on the example spatially dynamic display 104.

If the example display size monitor 302 retrieves and/or otherwise receives an indication that the example spatially dynamic display 104 changes to an alternate extension length associated with a reduction of both the first reduction zone 110 and the second reduction zone 112, thereby leaving 3.2 inches of available viewing, then the example source image comparator 304 is invoked by the display size monitor 302 to determine corresponding display parameters. In the illustrated example of FIG. 4, the table includes a third row 424 having information indicative of which icons are authorized for display and corresponding sizes for each authorized icon. In the illustrated example of FIG. 4, the third row 424 indicates that all icons having a primary priority are authorized to be displayed (see column 404) with an icon dimension of 32×32 pixels (see column 406). The example third row 424 also indicates that no secondary or tertiary icons are authorized for display (see columns 408 and 412, respectively), and that the link button 118 is authorized for rendering (see column 416).

While an example manner of implementing the dynamic display size manager 205 of FIG. 3 is illustrated in FIGS. 1A-1C, and 2-4, one or more of the elements, processes and/or devices illustrated in FIGS. 1A-C and 2-4 may be combined, divided, re-arranged, omitted, eliminated and/or implemented in any other way. Further, the example display size monitor 302, the example source image comparator 304, the example source image adjuster 306, the example prioritizer 308, the example link generator 310, the example configuration model settings storage 312, the example encoder 206, the example length marker sensor and/or, more generally, the example dynamic display size manager 205 of FIGS. 1A-1C and 2-4 may be implemented by hardware, software, firmware and/or any combination of hardware, software and/or firmware. Thus, for example, any of the example display size monitor 302, the example source image comparator 304, the example source image adjuster 306, the example prioritizer 308, the example link generator 310, the example configuration model settings storage 312, the example encoder 206, the example length marker sensor and/or, more generally, the example dynamic display size manager 205 of FIGS. 1A-1C and 2-4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example display size monitor 302, the example source image comparator 304, the example source image adjuster 306, the example prioritizer 308, the example link generator 310, the example configuration model settings storage 312, the example encoder 206, the example length marker sensor and/or, more generally, the example dynamic display size manager 205 of FIGS. 1A-1C and 2-4 is/are hereby expressly defined to include a tangible computer readable storage device or storage disk such as a memory, a digital versatile disk (DVD), a compact disk (CD), a Blu-ray disk, etc. storing the software and/or firmware. Further still, the example display size manager 205 of FIGS. 2 and 3 may include one or more elements, processes and/or devices in addition to, or instead of, those illustrated in FIG. 3, and/or may include more than one of any or all of the illustrated elements, processes and devices.

Figure 5:
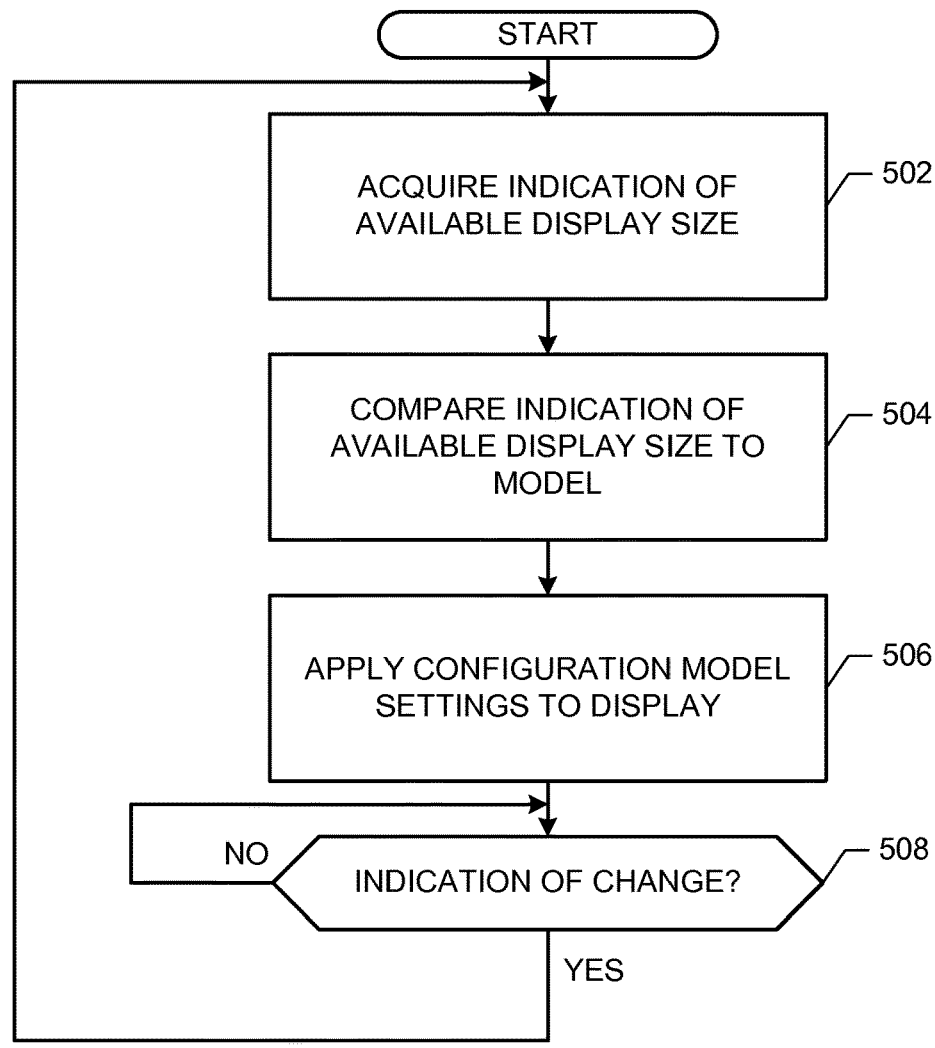
FIG. 5 is a flowchart representative of example machine readable instructions that may be executed to manage a spatially dynamic display in a manner consistent with the teachings of this disclosure.

A flowchart representative of example machine readable instructions for implementing the dynamic display size manager 205 of FIGS. 2 and 3 is shown in FIGS. 5. In this example, the machine readable instructions comprise program(s) for execution by a processor such as the processor 612 shown in the example processor platform 600 discussed below in connection with FIG. 6. The program(s) may be embodied in software stored on a tangible computer readable storage medium such as a CD-ROM, a floppy disk, a hard drive, a digital versatile disk (DVD), a Blu-ray disk, or a memory associated with the processor 612, but the entire program(s) and/or parts thereof could alternatively be executed by a device other than the processor 612 and/or embodied in firmware or dedicated hardware. Further, although the example program(s) is/are described with reference to the flowcharts illustrated in FIG. 5, many other methods of implementing the example dynamic display size manager 205 may alternatively be used. For example, the order of execution of the blocks may be changed, and/or some of the blocks described may be changed, eliminated, or combined.

As mentioned above, the example process of FIG. 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program 500 of FIG. 5 begins at block 502 where the example display size monitor 302 acquires an indication of an available display size of the example spatially dynamic display 104. As described above, an indication of the available display size that can be used (e.g., capable of being viewed by a user) may be determined by reading a rotary encoder value and/or detecting particular portions of the dynamic display 104 based on length markers 210 detected by the example length marker sensor 208. In still other examples, an indication of the available display size that can be used is determined by reading the length markers 210 to determine whether one or more fold portions (e.g., the first fold portion 252, the second fold portion 254, etc.) are either unfolded, partially folded, or completely folded. The acquired indication of available size is provided to the example source image comparator 304, which queries the example configuration model settings storage 312 to determine how the visual configuration of the example spatially dynamic display 104 should be changed (block 504). As shown in the example table 400 of FIG. 4, the indication of the available display size may be retrieved from the example display size monitor as an exposed length value (e.g., in centimeters, in millimeters, in inches, in pixels, etc.).

Based on the example source image comparator 304 identifying a match between the retrieved indication of available display area and a configuration setting in the example model settings storage 312, the example source image adjuster 306 sends one or more control signals to the example video I/O module 204 of the computing device 202 with which the spatially dynamic display 104 is attached (block 506). If the example display size monitor 302 does not identify an indication that the screen size has changed (block 508), then the example program 500 of FIG. 5 waits for such an occurrence. When an indication of a screen size change occurs (block 508), control returns to block 502 to retrieve the current available screen viewing area value.

Figure 6:
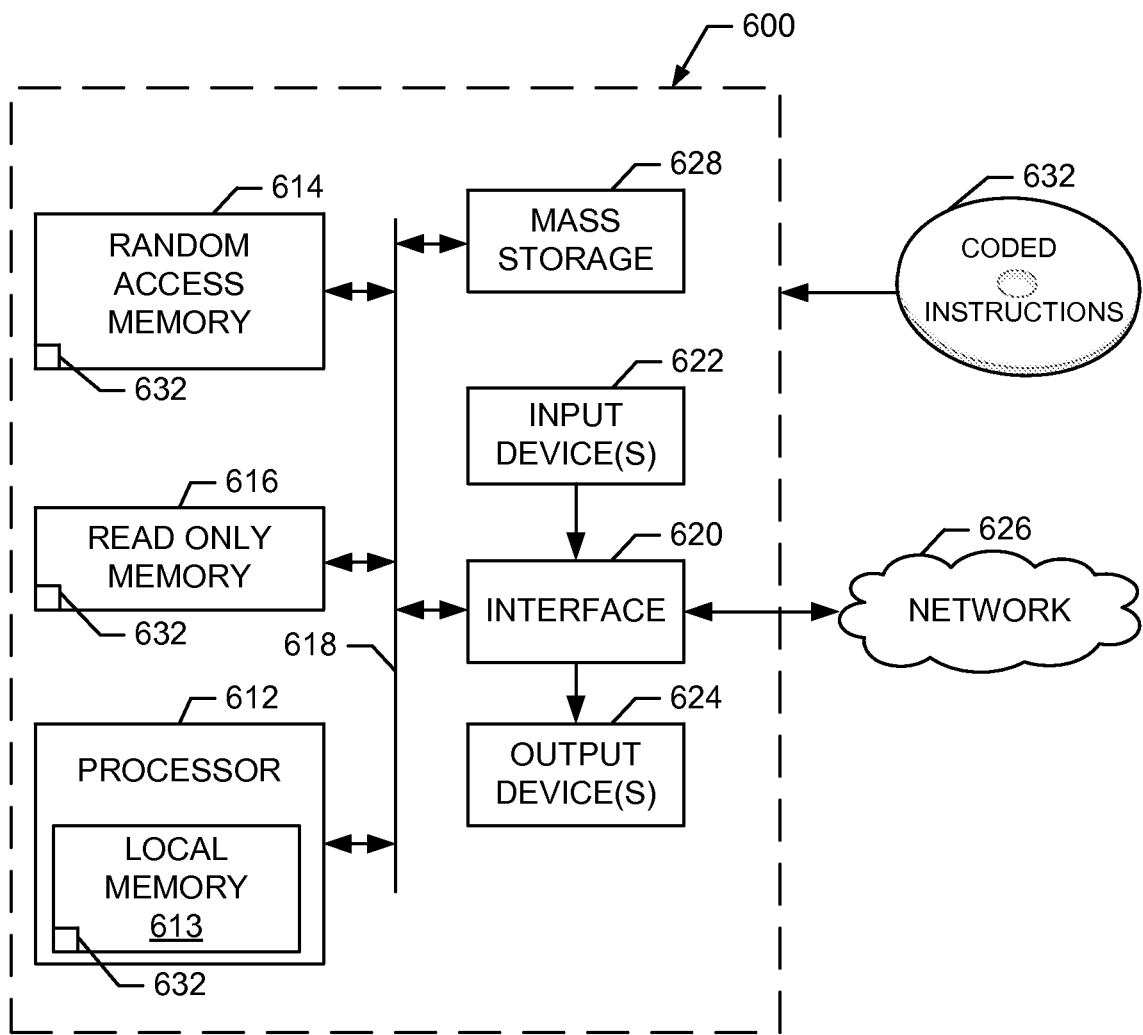
FIG. 6 is a schematic illustration of an example processor platform that may execute the instructions of FIG. 5 to implement the example system of FIGS. 1A-1C and 2-4.

FIG. 6 is a block diagram of an example processor platform 600 capable of executing the instructions of FIG. 5 to implement the dynamic display size manager 205 of FIGS. 2 and 3. The processor platform 600 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen). The interface circuit 620 of the illustrated example, thus, typically includes a graphics driver card, a graphics driver chip or a graphics driver processor. As described above, the graphics driver card, the graphics driver chip, or the graphics driver processor may be realized in a manner consistent with the example video I/O module 204 described above.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 of FIG. 5 may be stored in the mass storage device 628, in the volatile memory 614, in the non-volatile memory 616, and/or on a removable tangible computer readable storage medium such as a CD or DVD.

From the foregoing, it will be appreciated that the above disclosed methods, apparatus and articles of manufacture enable a dynamic viewing experience for users of computing devices that have display technologies that change in size from time to time. Display technologies that change in size may retract into a storage compartment of a computing device when not in use, and may be constructed of rigid sections that are foldable, or may be constructed of a flexible display material. During instances of extraction of the dynamic sized display technology, examples disclosed herein respond to the size changes (e.g., in real time) by adjusting the visual configuration of remaining portions of the display technology that are viewable to the user.

Examples may include subject matter such as a method, means for performing acts of the method, at least one machine-readable medium including instructions that, when performed by a machine, cause the machine to perform acts of the method, or of an apparatus or system to manage a spatially dynamic display according to embodiments and examples described herein.

Example 1 is an apparatus to update a spatially adjustable display, comprising a display size monitor to acquire an indication of a size of the spatially adjustable display; a service image comparator to compare the indication of the size to a size model, and a source image adjuster to invoke visual configuration adjustments to an output image of the spatially adjustable display based on parameters identified in the size model. The display size monitor, the service image comparator and/or the source image adjuster may each be integrated with a display size manager or as one or more separate devices.

Example 2 includes the subject matter of example 1, and further includes an encoder to identify an angular position indicative of the size of the spatially adjustable display. Much like the example display size monitor, the example encoder may be integrated with one or more other devices or operate as a stand-alone device to identify the angular position of interest.

Example 3 includes applying the encoder with a central storage axis, around which a non-visible portion of the spatially adjustable display is stored.

Example 4 includes applying the source image adjuster to send one or more instructions to disable output to the non-visible portion(s) of the spatially adjustable display.

Example 5 includes a length marker sensor to identify a position of the spatially adjustable display. The example length marker sensor may operate in conjunction with the display size manager, or may be implemented with any of the above examples as a separate device to identify the position of the spatially adjustable display.

Example 6 includes the subject matter of example 5, and further indicates a visible portion of the spatially adjustable display and indicates a non-visible portion of the spatially adjustable display.

Example 7 includes the subject matter of example 5, and further includes a plurality of length markers attached to and/or otherwise embedded within the spatially adjustable display in any number of locations along a viewing portion(s) of the spatially adjustable display.

Example 8 includes the subject matter of examples 2 or 5, and also includes identifying a portion of the spatially adjustable display that is not visible to a user and/or one or more portion(s) of the spatially adjustable display that are available for viewing by the user. Additionally or alternatively, example 8 may include the subject matter of examples 2 or 5, and include disabling a portion of the spatially adjustable display that is not visible to a user.

Example 9 includes the subject matter of example 1, and further includes a prioritizer to identify a display priority of any number of icons to be rendered on the spatially adjustable display. The prioritizer may operate as a sub-component of the example dynamic display size manager, or may operate as a stand-alone device in conjunction with any of the devices disclosed hereinabove.

Example 10 includes the subject matter of example 9, and further includes a link generator to render a link button on the spatially adjustable display when one or more of the plurality of icons are hidden from view due to the display priority. The link generator may be a device integrated with any of the above disclosed devices, or operate as a separate entity to render the link button.

Example 11 includes the subject matter of example 1, and further includes size information of the spatially adjustable display comprising at least one or a length value or an area value.

Example 12 includes the subject matter of example 1, and further includes the spatially adjustable display having a flexible display surface, and example 13 further includes storing the flexible display surface in a coil orientation.

Example 14 includes the subject matter of example 13, and further includes a first portion of the flexible display being hidden and/or otherwise removed from viewing by the user, while a second portion of the flexible display is uncoiled and visible to the user.

Example 15 includes the subject matter of example 1, and further includes the spatially adjustable display having at least one fold portion, and example 16 further includes a foldable display surface.

Example 17 includes subject matter from any of the aforementioned examples, and further includes a length marker sensor to identify an available display area of the spatially adjustable display, and example 18 includes any of the above-disclosed examples further comprising applying an icon size to the plurality of icons that is based on a length value or an area value.

Example 19 is a method for updating a spatially adjustable display to perform any of the aforementioned examples 1-18.

Example 20 is a system for updating a spatially adjustable display, and optionally includes means for performing any of the aforementioned examples 1-18.

Example 21 is at least one computer readable storage medium having instructions stored thereon that, when executed on a machine, cause the machine to perform any of the aforementioned examples 1-18.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An electronic device, comprising:
a rollable display screen;
a sensor to determine a length of an unrolled portion of the rollable display screen;
memory;
machine readable instructions; and
processor circuitry to execute the machine readable instructions to:
cause icons to be rendered on the unrolled portion of the rollable display screen, respective ones of the icons associated with priority values;
cause a first change of size for first ones of the icons associated with first ones of the priority values in response to a first change of the length of the unrolled portion of the rollable display screen; and
cause a second change of size for second ones of the icons associated with second ones of the priority values in response to the first change of the length of the unrolled portion of the rollable display screen, the first priority values different than the second priority values, the second size different than the first size.

2. The electronic device as defined in claim 1, wherein the first change of the length of the unrolled portion of the rollable display screen corresponds to an increase in length, and the first ones of the priority values are greater than the second ones of the priority values, the processor circuitry to cause the size of the first ones of the icons to increase.

3. The electronic device as defined in claim 1, wherein the first change of the length of the unrolled portion of the rollable display screen corresponds to a decrease in length, the first ones of the priority values are greater than the second ones of the priority values, and the processor circuitry is to:
cause the size of the first ones of the icons to decrease; and
cause the second ones of the icons to be removed from the unrolled portion of the rollable display screen.

4. The electronic device as defined in claim 1, wherein the rollable display screen is at least one of flexible around an axis of rotation or foldable.

5. The electronic device as defined in claim 1, further including length markers carried by the rollable display screen.

6. The electronic device as defined in claim 5, wherein the length markers are located at equally spaced positions along the rollable display screen.

7. The electronic device as defined in claim 5, wherein the sensor is to determine the length of the unrolled portion of the rollable display screen based on detecting respective ones of the length markers.

8. An apparatus comprising:
means for rendering icons, on an unrolled portion of a rollable display screen, respective ones of icons associated with priority values;
means for processing to:
cause a first change of size for first ones of the icons associated with first ones of the priority values in response to a first change of a length of the unrolled portion of the rollable display screen; and
cause a second change of size for second ones of the icons associated with second ones of the priority values in response to the first change of the length of the unrolled portion of the rollable display screen, the first priority values different than the second priority values, the second size different than the first size.

9. The apparatus as defined in claim 8, wherein the first change of the length of the unrolled portion of the rollable display screen corresponds to an increase in length, and the first ones of the priority values are greater than the second ones of the priority values, the processor circuitry to cause the size of the first ones of the icons to increase.

10. The apparatus as defined in claim 8, wherein the first change of the length of the unrolled portion of the rollable display screen corresponds to a decrease in length, the first ones of the priority values are greater than the second ones of the priority values, and the processor circuitry is to:
cause the size of the first ones of the icons to decrease; and
cause the second ones of the icons to be removed from the unrolled portion of the rollable display screen.

11. The apparatus as defined in claim 8, wherein the rollable display screen is at least one of flexible around an axis of rotation or foldable.

12. The apparatus as defined in claim 8, further including means for marking positions carried by the rollable display screen.

13. The apparatus as defined in claim 12, wherein the means for marking positions are located at equally spaced positions along the rollable display screen.

14. The apparatus as defined in claim 12, further including means for determining an available area of the rollable display screen based on detecting respective ones of the means for marking positions.

15. A non-transitory computer readable storage medium comprising instructions that, when executed, cause processor circuitry to at least:
display icons on the unrolled portion of the rollable display screen, respective ones of the icons associated with priority values;
cause a first change of size for first ones of the icons associated with first ones of the priority values in response to a first change of the length of the unrolled portion of the rollable display screen; and
cause a second change of size for second ones of the icons associated with second ones of the priority values in response to the first change of the length of the unrolled portion of the rollable display screen, the first priority values different than the second priority values, the second size different than the first size.

16. The computer readable storage medium as defined in claim 15, wherein the instructions, when executed, cause the processor circuitry to identify:
the first change of the length of the unrolled portion of the rollable display screen corresponds to an increase in length; and
the first ones of the priority values are greater than the second ones of the priority values, the processor circuitry to cause the size of the first ones of the icons to increase.

17. The computer readable storage medium as defined in claim 15, wherein the instructions, when executed, cause the processor circuitry to:
identify the first change of the length of the unrolled portion of the rollable display screen corresponds to a decrease in length, the first ones of the priority values are greater than the second ones of the priority values;
cause the size of the first ones of the icons to decrease; and
cause the second ones of the icons to be removed from the unrolled portion of the rollable display screen.

18. The computer readable storage medium as defined in claim 15, wherein the instructions, when executed, cause the processor circuitry to detect one or more length markers carried by the rollable display screen.

19. The computer readable storage medium as defined in claim 18, wherein the instructions, when executed, cause the processor circuitry to determine the length of the unrolled portion of the rollable display screen based on detecting a quantity of the one or more length markers carried by the rollable display screen.

* * * * *